US007611084B2

United States Patent
Bisio

(10) Patent No.: US 7,611,084 B2
(45) Date of Patent: Nov. 3, 2009

(54) CONTAINER-GRATER FOR A FRIABLE FOOD PRODUCT

(75) Inventor: Stefano Bisio, Alessandria (IT)

(73) Assignee: Bisio Progetti S.p.A. (IT)

( * ) Notice: Subject to any disclaimer, the term of this patent is extended or adjusted under 35 U.S.C. 154(b) by 205 days.

(21) Appl. No.: 11/667,609

(22) PCT Filed: Nov. 15, 2004

(86) PCT No.: PCT/IT2004/000625

§ 371 (c)(1),
(2), (4) Date: May 11, 2007

(87) PCT Pub. No.: WO2006/051564

PCT Pub. Date: May 18, 2006

(65) Prior Publication Data

US 2007/0267528 A1    Nov. 22, 2007

(51) Int. Cl.
*B02C 17/02* (2006.01)
*B07B 13/00* (2006.01)
(52) U.S. Cl. .................. 241/88.4; 241/89.4; 241/95; 241/169.1; 241/273.2
(58) Field of Classification Search ............. 241/91, 241/95, 88.1, 88.4, 89.4, 273.2, 169.1
See application file for complete search history.

(56) References Cited

U.S. PATENT DOCUMENTS 2,728,368 A * 12/1955 Guilder ................ 241/37.5
2,896,683 A *  7/1959 Bowland .............. 241/89.4
3,137,333 A *  6/1964 Nishina ............... 241/273.2
3,464,469 A *  9/1969 Belz ..................... 241/93
3,645,310 A *  2/1972 Hartley .................. 241/85
3,738,596 A *  6/1973 Miles .................... 241/95
2004/0140323 A1    7/2004 Ricotti

FOREIGN PATENT DOCUMENTS

DE    4333096 A1 *  4/1994
FR    2 510 381       2/1983

OTHER PUBLICATIONS

International Search Report re application No. PCT/IT2004/000625, dated Aug. 8, 2005.
Written Opinion re application No. PCT/IT2004/000625, dated Aug. 8, 2005.

* cited by examiner

*Primary Examiner*—Bena Miller
(74) *Attorney, Agent, or Firm*—Cook Alex Ltd.

(57) ABSTRACT

The container-grater comprises a base (10) on which an inverted cup-shaped element (12) having a polygonal cross-section is mounted rotatably so as to define a chamber (14) for containing the food product. The base (10) includes a grating plate (18) which constitutes the bottom of the chamber (14) and has a plurality of through-holes (20), with the edges of which respective teeth (22) that project into the chamber (14) are associated. Furthermore, a threaded rod (30) extends upwards from the plate (18) into the chamber (14) and a pressure plate (32) has a central, threaded hole (34) which is engaged by the rod (30) and an outer perimeter suitable for engaging with the internal wall of the element (12) in a manner such that rotation of the element (12) relative to the base (10) brings about translation of the plate (32) along the rod (30) and compression of the food product against the plate (18) so that the food product is broken up and dispensed from the containing chamber (14). The container-grater further comprises means for cutting the grated product, which are provided at the side of the grating plate (18) remote from the containing chamber (14).

11 Claims, 11 Drawing Sheets

US 7,611,084 B2

CONTAINER-GRATER FOR A FRIABLE FOOD PRODUCT

The present invention relates to a container-grater for a friable food product, such as, for example, cheese.

An article of this type performs both the function of a packaging for the food product, isolating it from the outside environment during transport and storage at the point of sale and by the customer, and the function of a grater at the time of consumption.

Known models of a container-grater of this type comprise:
a base on which an inverted cup-shaped element having a polygonal cross-section is mounted rotatably so as to define a chamber for containing the food product, the base including a grating plate which constitutes the bottom of the chamber and has a plurality of through-holes, with the edges of which respective teeth that project into the chamber are associated,
a threaded rod which extends upwards from the grating plate into the chamber, and
a pressure plate having a central, threaded hole which is engaged by the threaded rod and an outer perimeter suitable for engaging with the internal wall of the inverted cup-shaped element in a manner such that rotation of the inverted cup-shaped element relative to the base brings about translation of the pressure plate along the rod and compression of the food product against the plate so that the food product is broken up and dispensed from the containing chamber.

During grating, the teeth of the plate move with a circular movement relative to the piece of cheese which, since it is clamped inside the containing chamber, is cut into at the bottom in its circumferential portions which face the path of each tooth and is thus broken up and dispensed. As a result of the constant repetition of that movement, the grated product is in the form of elongate strands, completely different from the flake-like shape produced by the irregular movement of a piece of cheese rubbed by hand by a consumer against a conventional plate-like grater, that is to say, lacking means for containing and retaining the cheese.

Moreover, the elongate-strand-like appearance of the grated cheese can be considered to be undesirable or unusual for consumers accustomed to the flaked appearance produced by conventional graters.

The object of the present invention is to provide a container-grater for a friable food product in order to be able to bring about the formation of a flake-like grated product.

According to the invention, this object is achieved by virtue of a container-grater and of the respective grating plate which have the characteristics specified in the appended claims.

Figure 1:
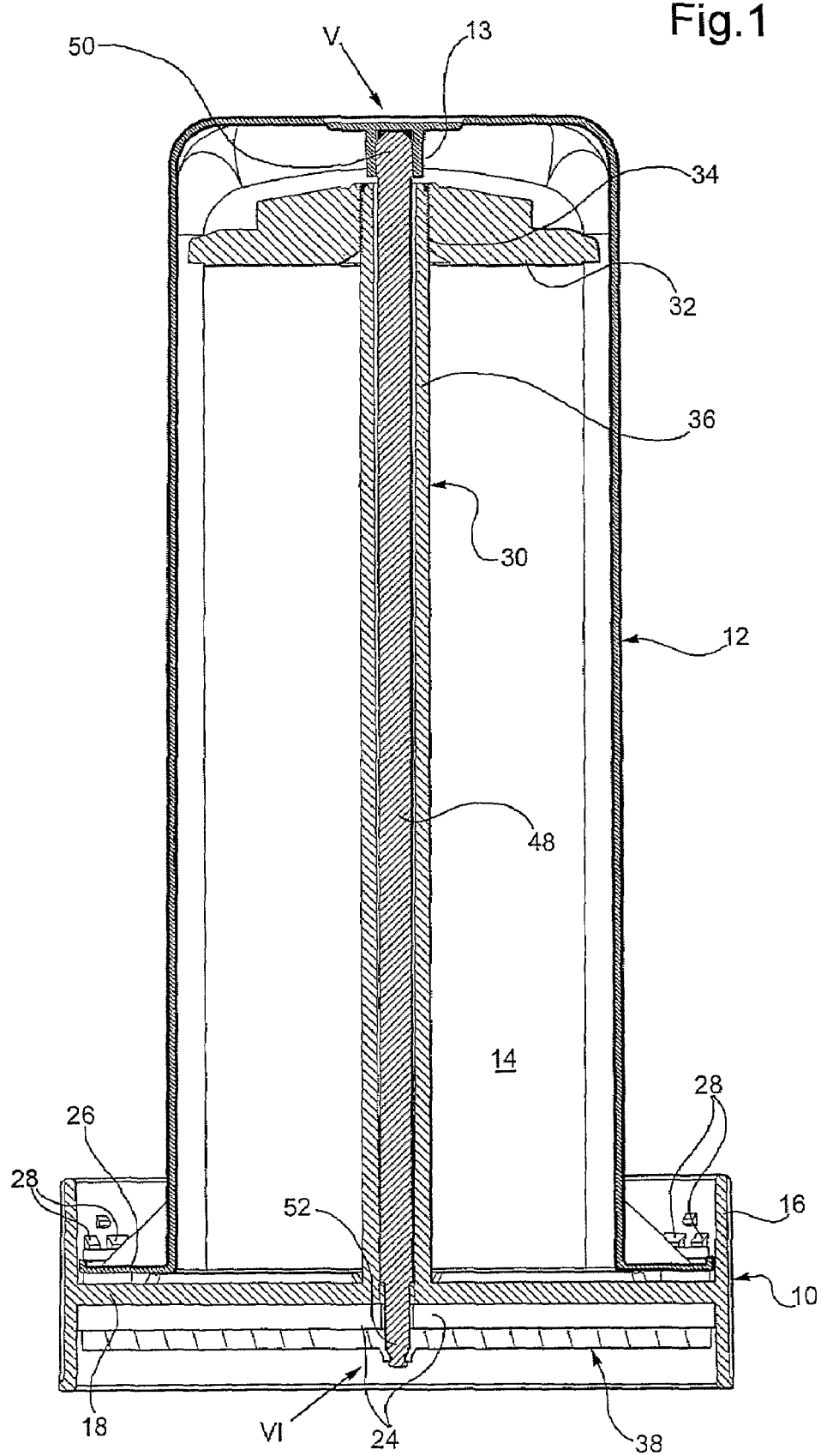
Figure 2:
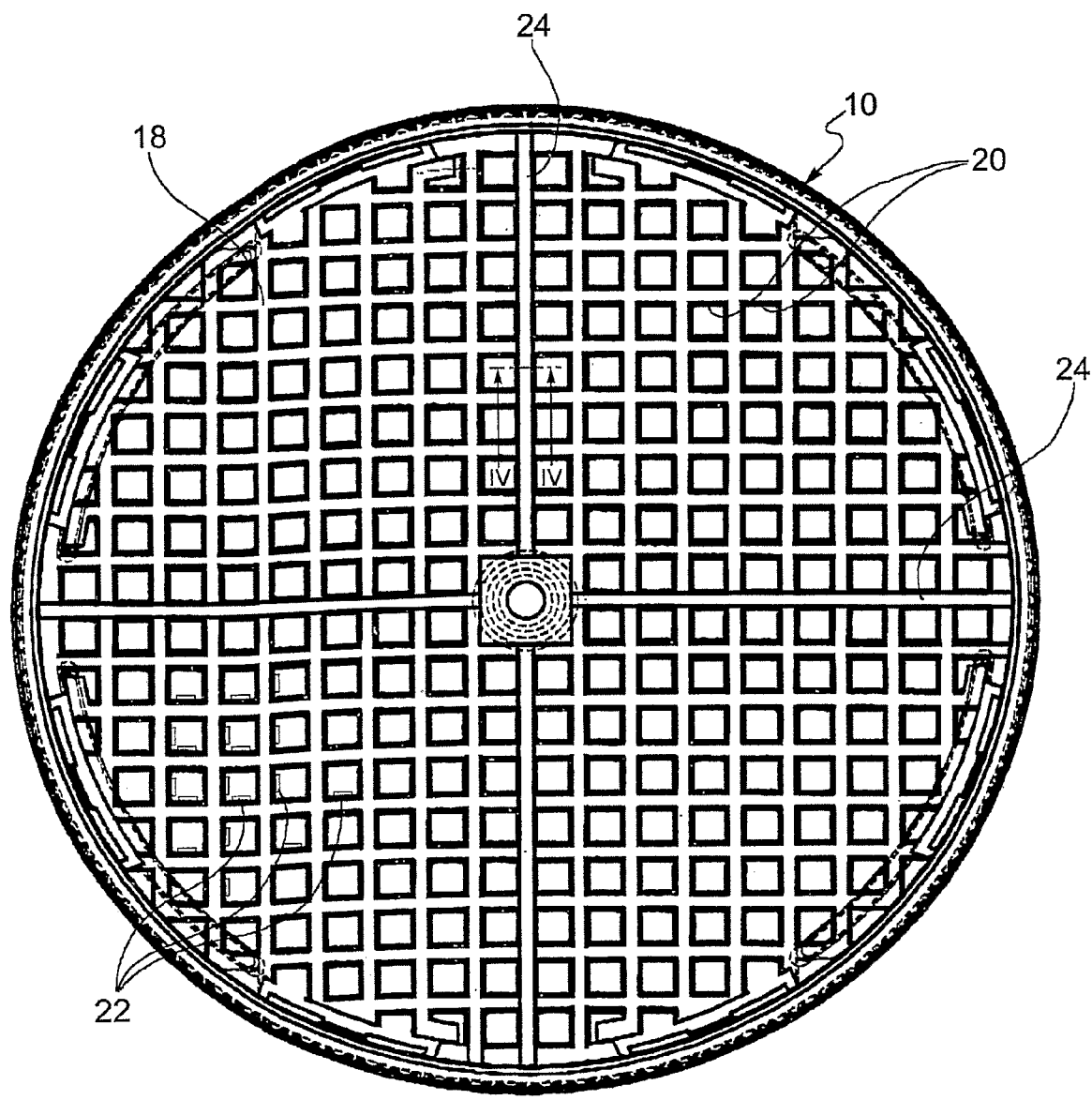
Figure 3:
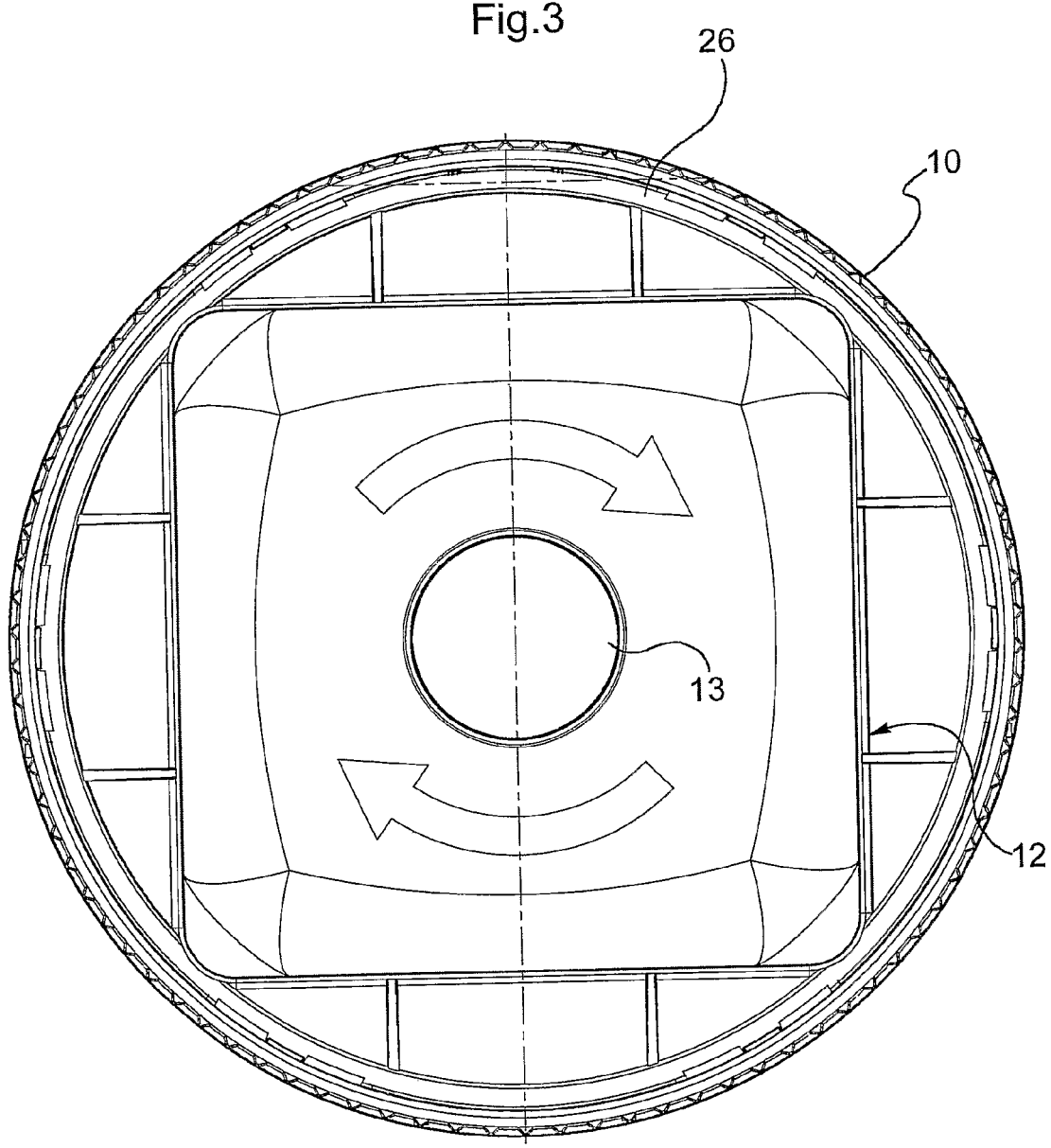
Figure 4:
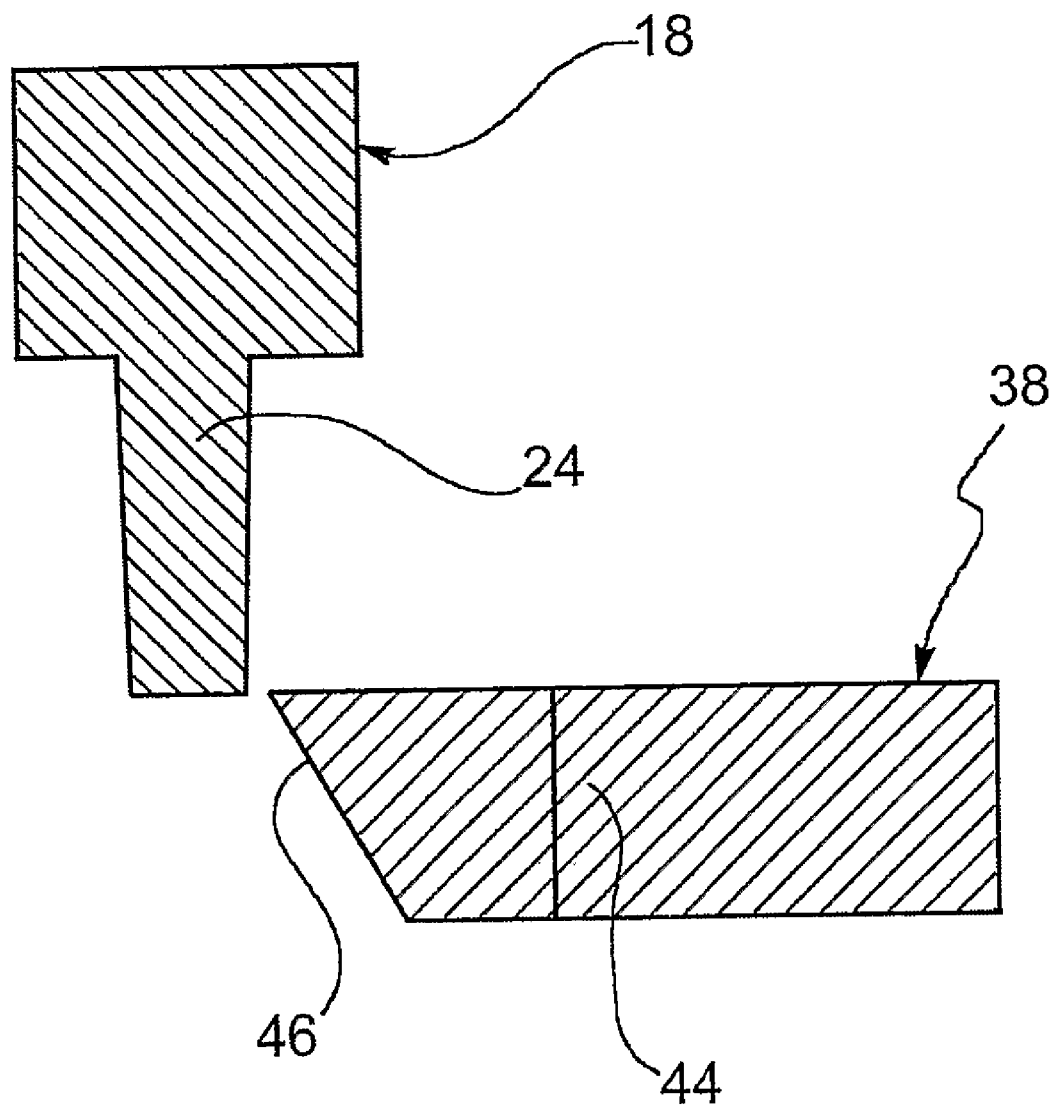
Figure 5:
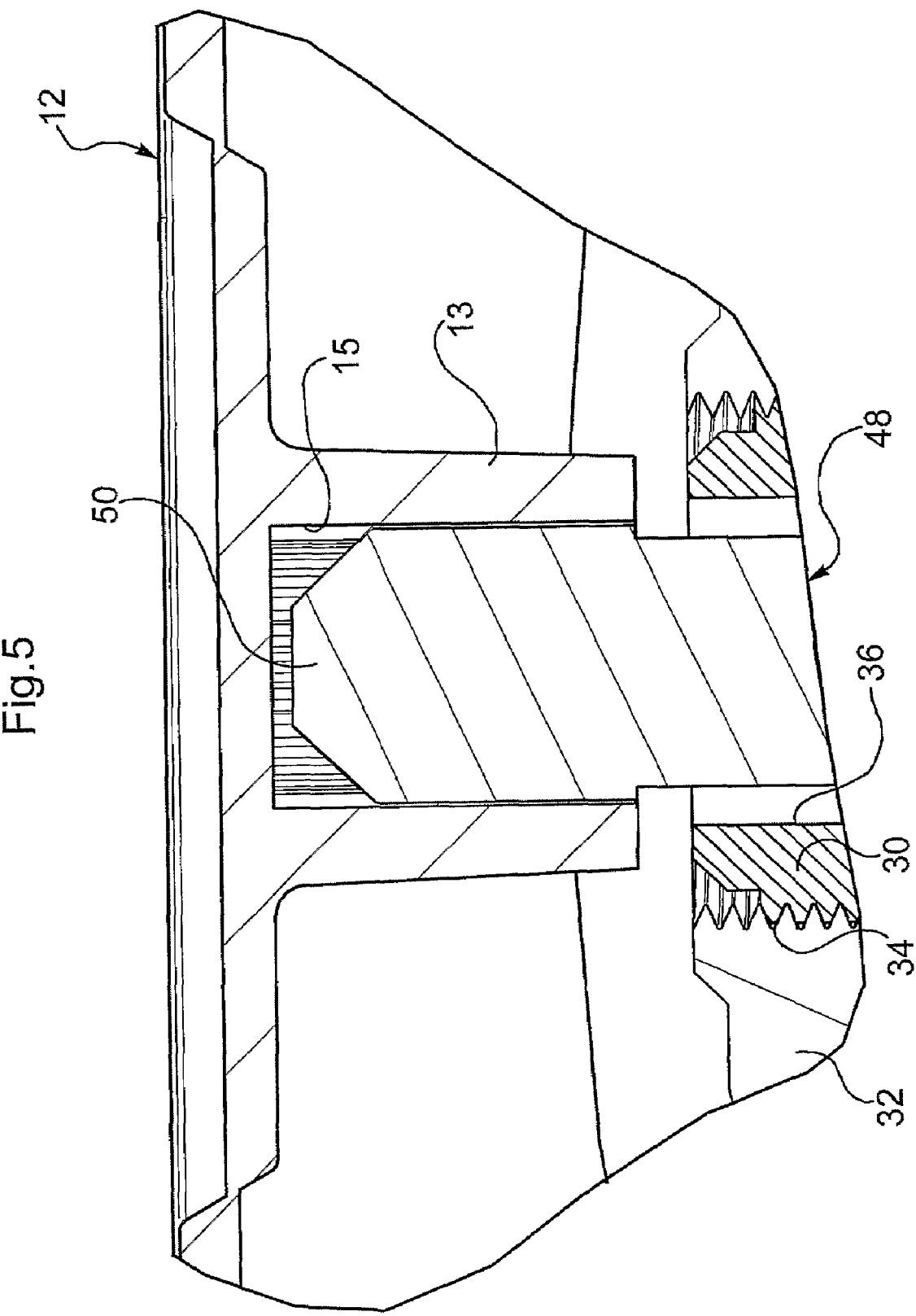
Figure 6:
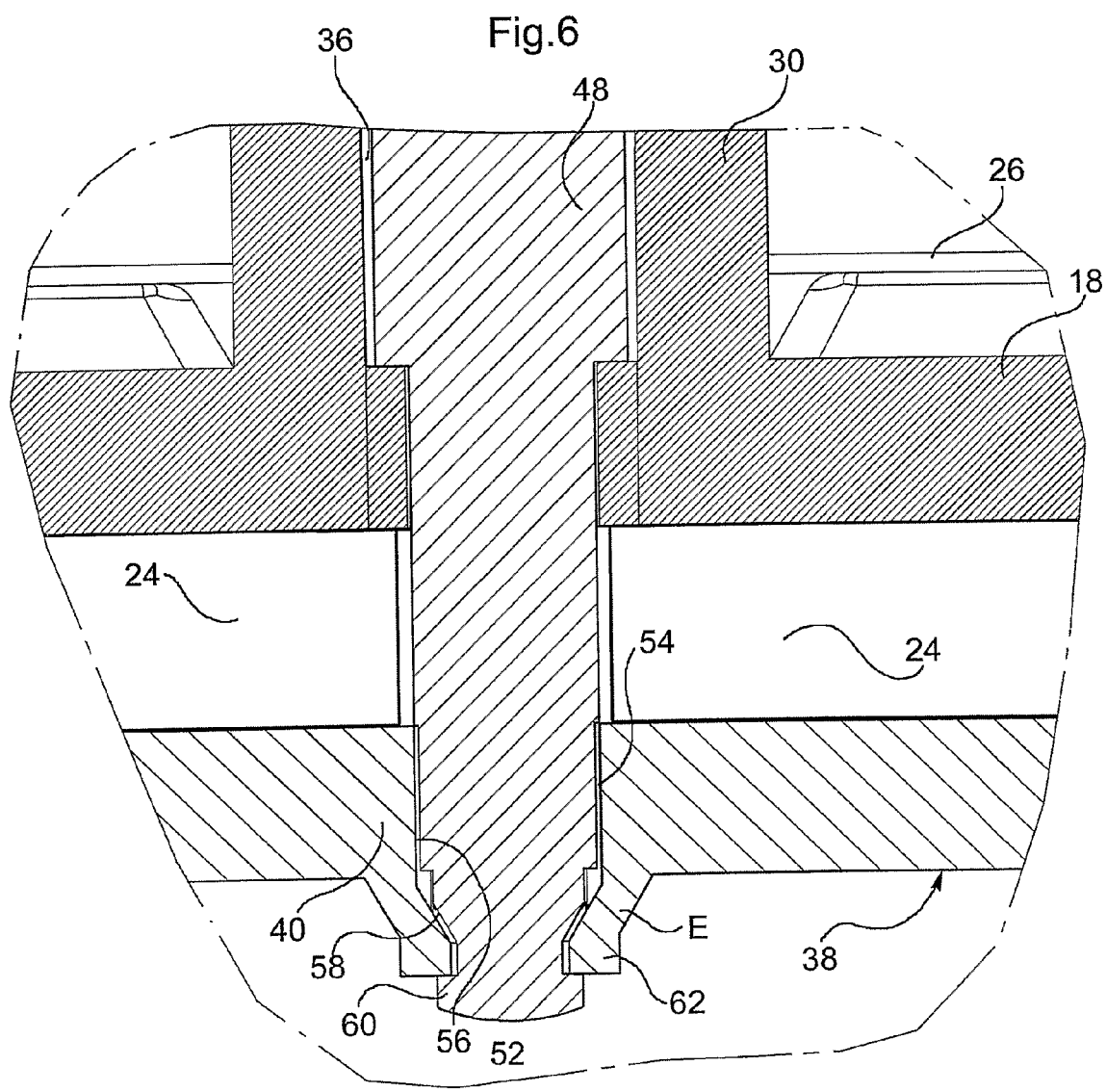
Figure 7:
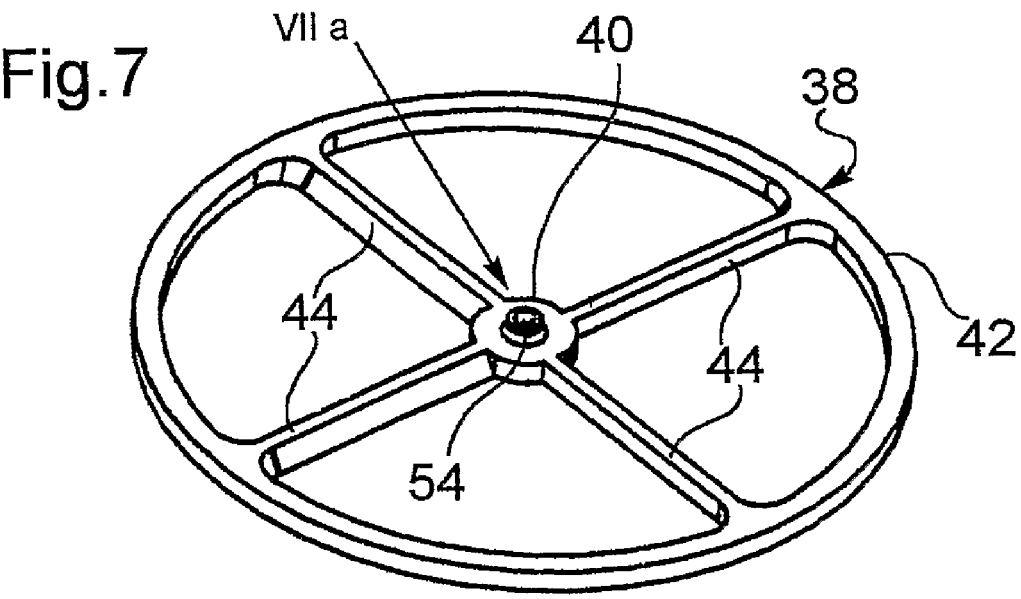
Figure 7A:
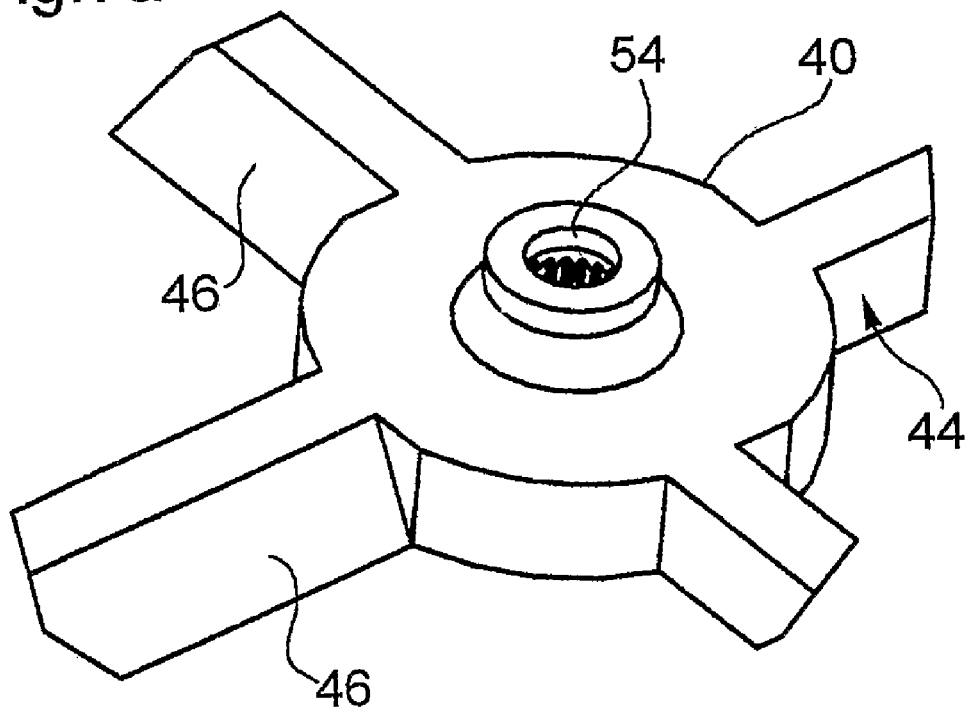
Figure 8:
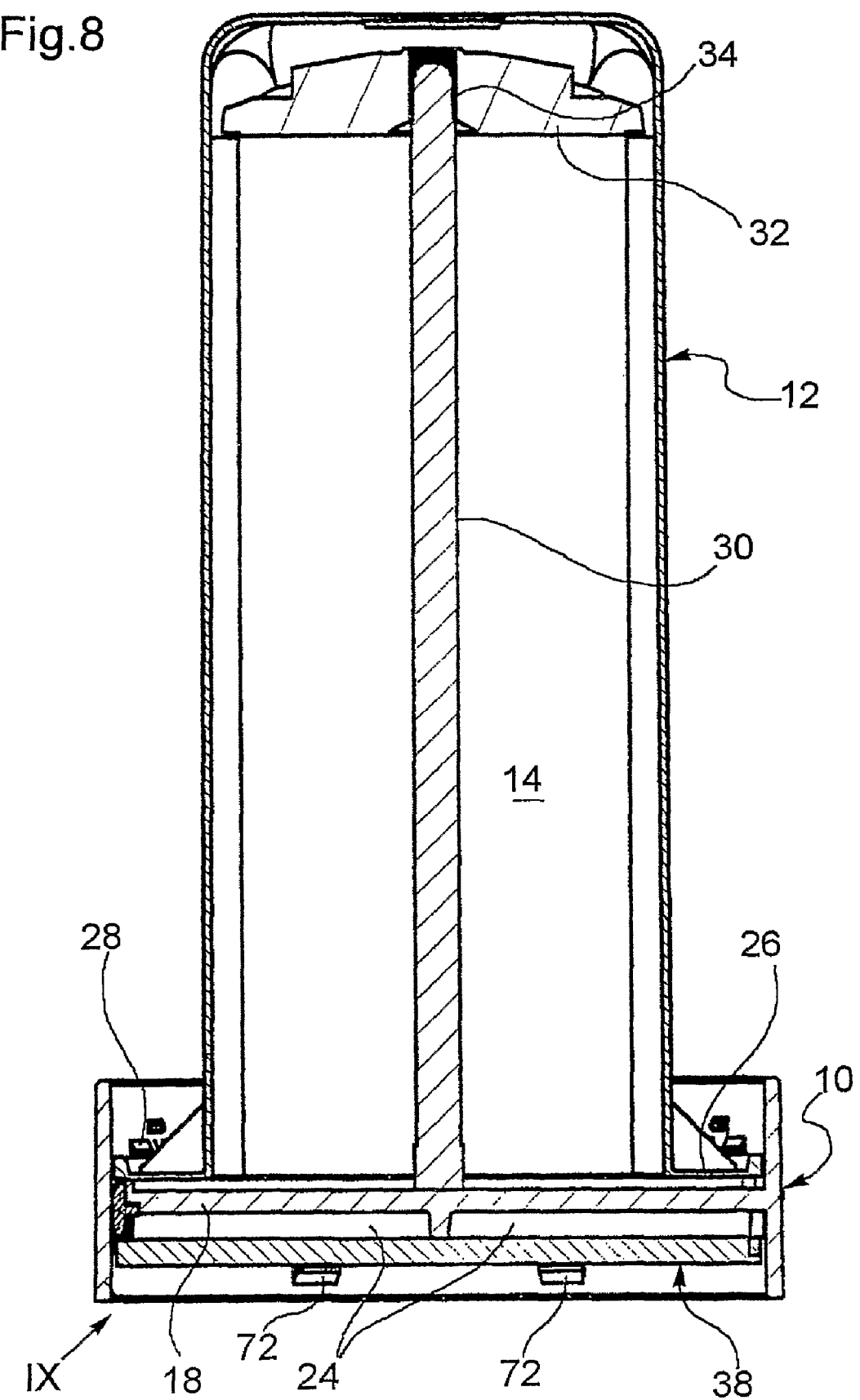
Figure 9:
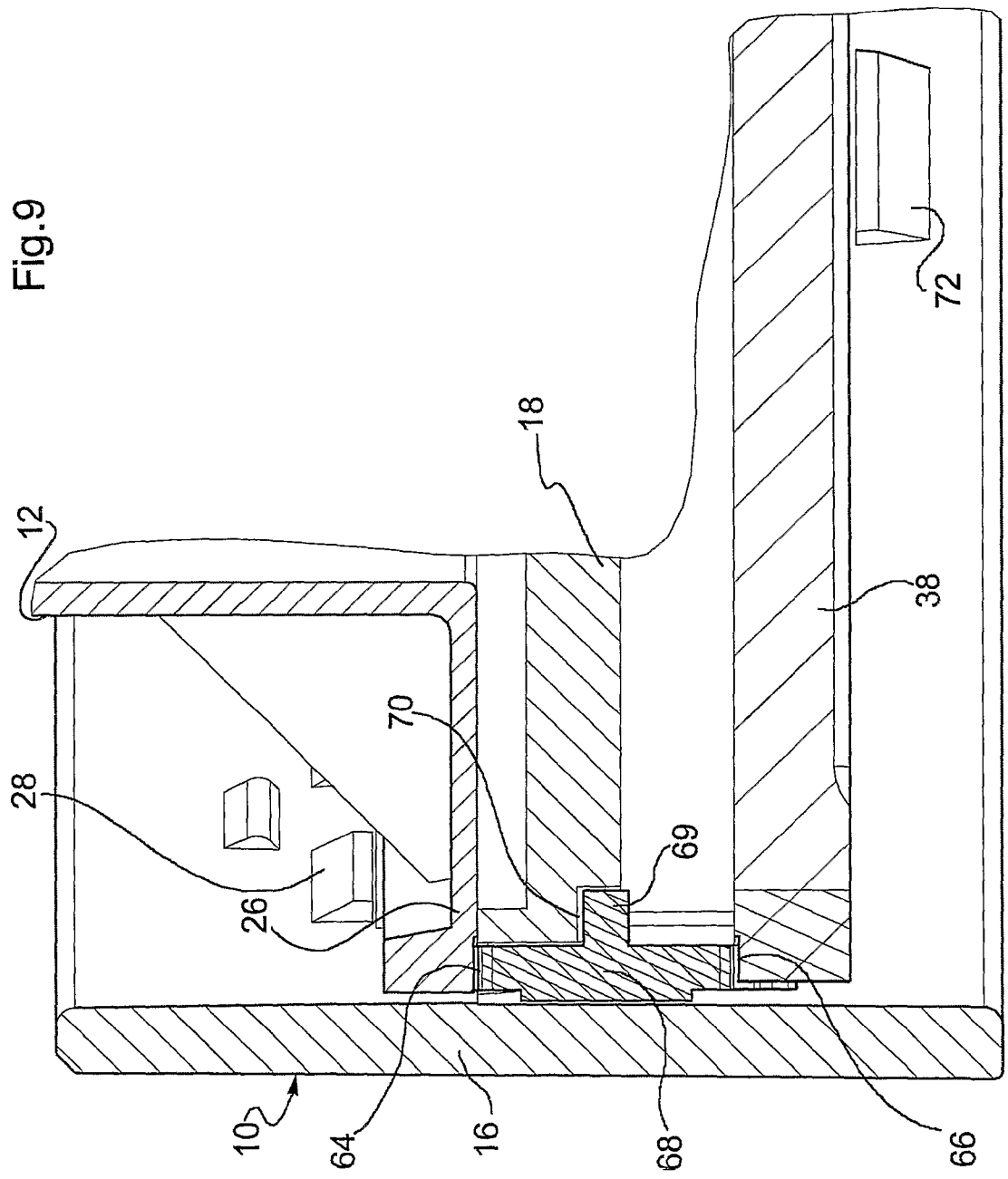
Figure 10:
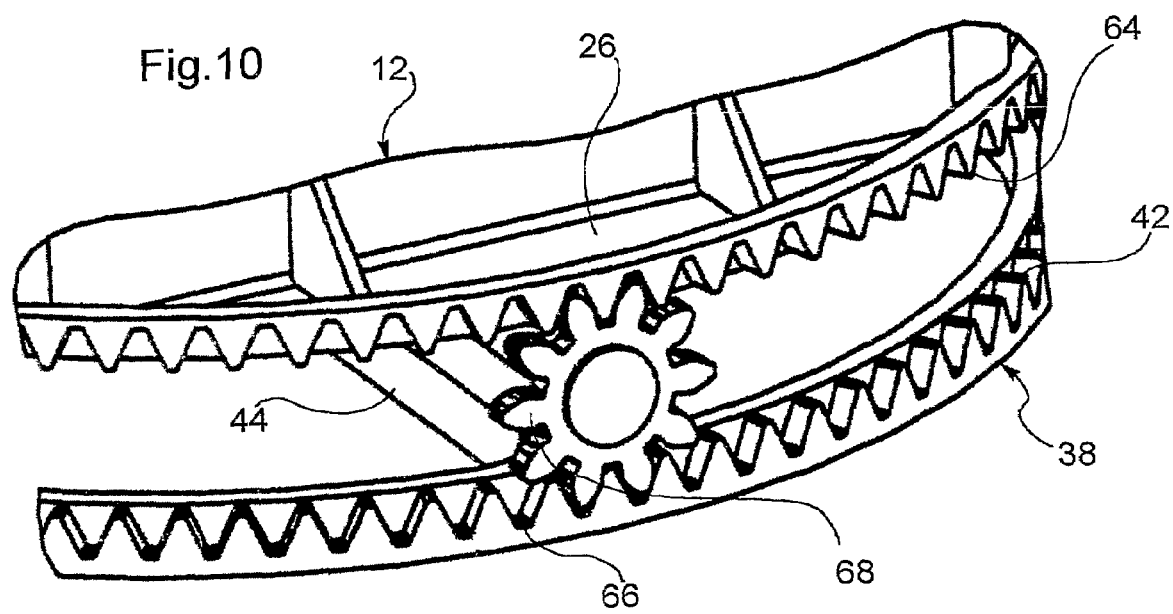
Figure 11:
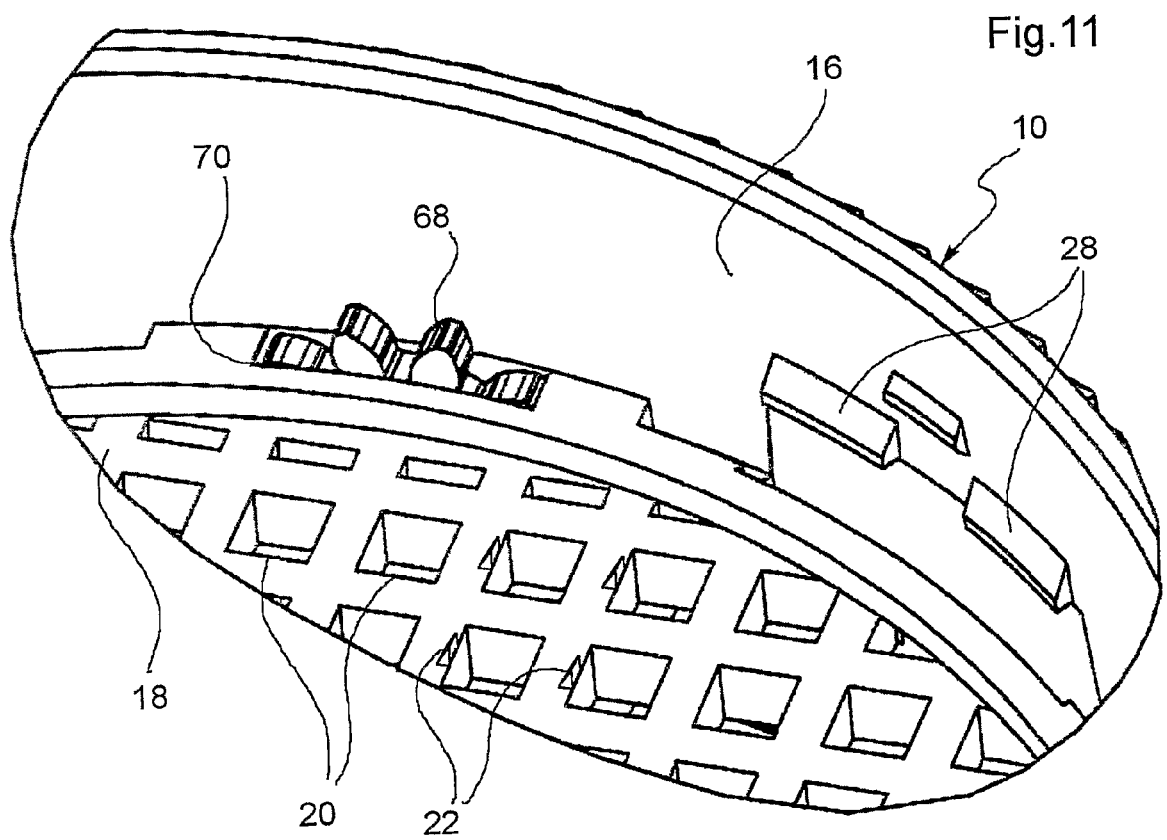

Advantages and characteristics of the present invention will become clear from the following detailed description which is provided by way of non-limiting example with reference to the appended drawings, in which:

FIG. 1 is a schematic, elevational view of a container-grater of the invention,

FIG. 2 is a plan view from below of the container-grater of FIG. 1 in which, for greater clarity, the rotor has been omitted, FIG. 3 is a plan view from above of the container-grater of FIG. 1, FIG. 4 is a section taken on line IV-IV of FIG. 2, FIGS. 5 and 6 are views, drawn to an enlarged scale, of respective details of the container-grater of the preceding Figures, FIG. 7 is a perspective view of the rotor of the container-grater of the preceding Figures, FIG. 7a shows, drawn to an enlarged scale, a detail of preceding FIG. 7, FIG. 8 is a schematic elevational view of another embodiment of the container-grater according to the invention, FIG. 9 is a view, drawn to an enlarged scale, of a detail of the container-grater of FIG. 8, FIG. 10 is a perspective view of a detail of the container-grater of FIG. 8 in which, for greater clarity, the base comprising the grating plate has been omitted, and FIG. 11 is a perspective view of another detail of the container-grater of FIG. 8 in which, for greater clarity, the flange of the mouth of the inverted cup-shaped element has been omitted.

A container-grater for a friable food product, in particular a piece of cheese, comprises (FIGS. 1-3) a base 10 on which an inverted cup-shaped element 12 having a polygonal, in particular square, cross-section is mounted rotatably so as to define a chamber 14 for containing the cheese. A bushing 13, which internally defines a hollow seat 15, protrudes from the end wall of the cup-shaped element.

The base 10 comprises a circular sleeve 16 inside which a circular grating plate 18 is fixed transversely and constitutes the bottom of the containing chamber 14. The grating plate 18 has a plurality of square through-holes 20 which are arranged in a plurality of parallel rows. Teeth 22 are associated with the edge of the holes 20 in a manner known per se and protrude into the containing chamber 14. The form, arrangement and number of teeth 22 are conventional and substantially unimportant as regards the present invention, so that further details will not be provided in this regard.

Protruding from the lower face of the plate 18 (FIGS. 2 and 4) there is a first rib 24 which extends diametrically along the lower face and a second rib 24 which extends diametrically along the face and perpendicularly to the first rib 24.

The inverted cup-shaped element 12 further has at its mouth a flange 26 having an outer perimeter which reproduces the profile of the internal cross-section of the sleeve 16. The flange 26 is kept associated with the facing surface of the plate 18 by means of projections 28 which protrude radially from the internal wall of the sleeve 16.

A threaded rod 30 having an axis parallel with that of the sleeve 16 extends upwards from the centre of the grating plate 18 into the chamber 14. A pressure plate 32 having a square outer perimeter which reproduces the shape of the internal wall of the inverted cup-shaped element 12 is engaged by the threaded rod 30 through a central, threaded hole 34. The rod 30 is of tubular structure and internally defines a cavity 36 which extends along the axis thereof.

A rotor is arranged in the sleeve 16 under the grating plate 18 and comprises (FIG. 7) a central hub 40, a circular ring 42 which is coaxial with the hub 40 and a plurality of cutting elements 44 which connect the hub 40 and the ring 42 in the manner of spokes. The spokes have cross-sections in the form of right-angled trapezoids, with the oblique side 46 inclined forwards in the direction of rotation of the rotor.

A pin 48 is mounted with its central portion able to rotate freely in the cavity 36 of the rod 30 and has the upper end 50 (FIG. 5) fixed in the seat 15 and the lower end 52 (FIG. 6) fixed in a hole 54 which is provided in the hub 40 of the rotor 38.

The facing surfaces of the side walls of the ends 50, 52 of the pin 48, the hole 54 and the seat 15 have respective knurled surfaces having complementary profiles, which prevent relative rotation thereof. Consequently, the cup-shaped element 12, the pin 48 and the rotor 38 constitute a rigid member.

The lower end 52 of the pin 48 further has, in succession after a knurled portion 56, a tapering portion 58 and a radially protruding head 60, and a projection 62 which extends resiliently in a radially inward direction protrudes from the lower edge of the hole 54 of the hub 40. The projection 62 can be coupled to the tapering portion 58 of the lower end 52 of the pin 48 and can come into abutment against the head 60, so that movement of the rotor 38 in an axial direction away from the pin 48 is prevented.

During grating, the rotation of the inverted cup-shaped element 12 (to which the piece of cheese is fixed) relative to the base 10 brings about downward translation of the pressure plate 32 along the rod 30 and the compression of the piece of cheese against the plate 18. The cheese is thus broken up by the teeth 22 into fragments in the form of strands which pass through the holes 20.

The strands which fall from the holes 20 are subsequently compelled to pass (FIG. 4) between a corner of the lower edge of a rib 24, which remains stationary, and a cutting element 44 of the rotor 38, which rotates together with the cup-shaped element 12, being connected to it by the pin 48. Consequently, a cutting action is produced on the strands, the length of which is considerably reduced and which thereby assume a flake type appearance. By suitably selecting the number and form of the spokes, as well as the number and height of the ribs 24, it is possible to bring about the formation of flakes having desired geometric features.

FIGS. 8 to 11 illustrate another embodiment of the invention, wherein the same numerals as those used with reference to the preceding Figures indicate identical or equivalent elements.

This last embodiment differs from the preceding one in respect of the construction of the means which allow the rotational movement of the inverted cup-shaped element 12 to be transmitted to the rotor 38.

In this case, the lower surface of the flange 26 of the mouth of the element 12 carries, at its perimeter, a first set of teeth 64, and the circular ring 42 of the rotor 38 has, at its upper surface, a second set of teeth 66.

A toothed wheel 68 having a suitable hub 69 is accommodated in a seat 70 formed in a portion of the outer perimeter of the grating plate 18 and is interposed (FIGS. 9 and 10) between the first set of teeth 64 and the second set of teeth 66, being in engagement with both. The toothed wheel 68 is thus mounted so as to rotate about its axis which is orientated radially in a perpendicular direction relative to the axis of the rod 30. This rod—unlike the previous embodiment—is not hollow and does not therefore receive any pin therein.

Since the pin is absent, the bottom of the cup-shaped element does not have any bushing for receiving the upper end thereof, nor does the hub of the rotor have any hole for receiving the lower end thereof. Instead, a plurality of circumferentially spaced-apart projections 72 protrude radially inwards (FIG. 9) from the internal side wall of the sleeve 16 and, being arranged under the rotor 38, support it axially and prevent it from moving in a direction away from the grating plate 18.

The general operation of the container-grater, the formation of cheese fragments in the form of strands which fall through the holes 20 and the subsequent cutting thereof as a result of the passage between a corner of the lower edge of a rib 24 and a spoke of the rotor 38 are effected in a manner similar to the previous case. However, the rotation of the rotor 38 is brought about by its set of teeth 66 being engaged with the toothed wheel 68 which is itself caused to rotate about its own axis by engagement with the first set of teeth 64 which is carried by the flange 26 of the element 12, which is rotated by the user. As a result of such a construction of the movement transmission mechanism, the rotation of the rotor 38 is effected in the opposite direction relative to that of the cup-shaped element 12. The cutting action which is produced on the strands thus remains substantially unchanged with respect to the previously described embodiment.

In construction variants which are not illustrated, it is possible to provide for the presence of more complex movement transmission kinematic mechanisms which allow the speed of rotation of the rotor 38 to be varied with respect to that of the cup-shaped element 12 so as to reduce, for example, the overall force required from the user in order to grate. Such kinematic mechanisms may further allow the rotor 38 to be rotated in the same direction as the cup-shaped element 12.

Naturally, the principle of the invention remaining the same, the details of construction and the forms of embodiment may vary widely with respect to those described purely by way of example, without thereby departing from the claimed scope.

The invention claimed is:

1. A container-grater for a friable food product, comprising:
   a base (10) on which an inverted cup-shaped element (12) having a polygonal cross-section is mounted rotatably so as to define a chamber (14) for containing the food product, the base (10) including a grating plate (18) which constitutes the bottom of the chamber (14) and has a plurality of through-holes (20), with the edges of which respective teeth (22) that project into the chamber (14) are associated,
   a threaded rod (30) which extends upwards from the grating plate (18) into the chamber (14), and
   a pressure plate (32) having a central, threaded hole (34) which is engaged by the threaded rod (30) and an outer perimeter suitable for engaging with the internal wall of the inverted cup-shaped element (12) in a manner such that rotation of the inverted cup-shaped element (12) relative to the base (10) brings about translation of the pressure plate (32) along the rod (30) and compression of the food product against the plate (18) so that the food product is broken up and dispensed from the containing chamber (14),
   the container-grater being characterized in that it comprises means for cutting the grated product, which are provided at the side of the grating plate (18) remote from the containing chamber (14), the cutting means comprising a rotor (38) which has at least one cutting element (44), the rotation of that rotor (38) being controlled by the rotation of the inverted cup-shaped element (12).

2. A container-grater according to claim 1, characterized in that the rotor (38) comprises a central hub (40), a circular ring (42) which is coaxial with the hub (40) and a plurality of cutting elements (44) which connect the hub (40) and the ring (42) in the manner of spokes.

3. A container-grater according to claim 2, characterized in that the spokes have cross-sections in the form of right-angled trapezoids, with the oblique side (46) inclined forwards in the direction of rotation of the rotor (38).

4. A container-grater according to claim 1, characterized in that the cutting means comprise at least one rib (24) which protrudes from the lower face of the grating plate (18) and which can co-operate with the at least one cutting element (44) of the rotor (38).

5. A container-grater according to claim 4, characterized in that the cutting means comprise a first rib (24) which extends diametrically along the lower face of the grating plate (18) and a second rib (24) which extends diametrically along the lower face of the grating plate (18) perpendicularly to the first rib (24).

6. A container-grater according to claim 1, characterized in that the rod (30) has a tubular structure and internally defines a cavity (36), a bushing (13) which internally defines a hollow seat (15) protrudes from the end wall of the cup-shaped element and the hub (40) of the rotor (38) has a hole (54), a pin (48) being mounted with its central portion able to rotate freely in the cavity (36) of the rod (30) and having the upper end (50) fixed in the seat (15) and the lower end (52) fixed in the hole (54).

7. A container-grater according to claim 6, characterized in that the facing surfaces of the side walls of the ends (50, 52) of the pin (48), the hole (54) and the seat (15) have respective knurled surfaces having complementary profiles, which prevent relative rotation thereof.

8. A container-grater according to claim 7, characterized in that the lower end (52) of the pin (48) has successively a knurled portion (56), a tapering portion (58) and a radially protruding head (60), and a projection (62) which extends resiliently in a radially inward direction protrudes from the lower edge of the hole (54) of the hub (40) and can be coupled with the tapering portion (52) of the pin (48) and can come into abutment against the head (60).

9. A container-grater according to any claim 1, characterized in that the inverted cup-shaped element (12) has, at its mouth, a flange (26) which carries, at the perimeter of its lower surface, a first set of teeth (64) and the circular ring (42) of the rotor (38) has, at its upper surface, a second set of teeth (66), a toothed wheel (68) being interposed between and engaging with the first and second sets of teeth (64, 66).

10. A container-grater according to claim 9, characterized in that the toothed wheel (68) is accommodated so as to rotate freely about its axis in a seat (70) which is formed in a portion of the outer perimeter of the grating plate (18).

11. A container-grater according to claim 9, characterized in that the base (10) comprises a circular sleeve (16), in which a grating plate (18) is transversely fixed, a plurality of circumferentially spaced-apart projections (72), which act as a support for the rotor (38), protruding radially inwards under the grating plate (18) from the internal side wall of the sleeve (16).

* * * * *